Figure 1:
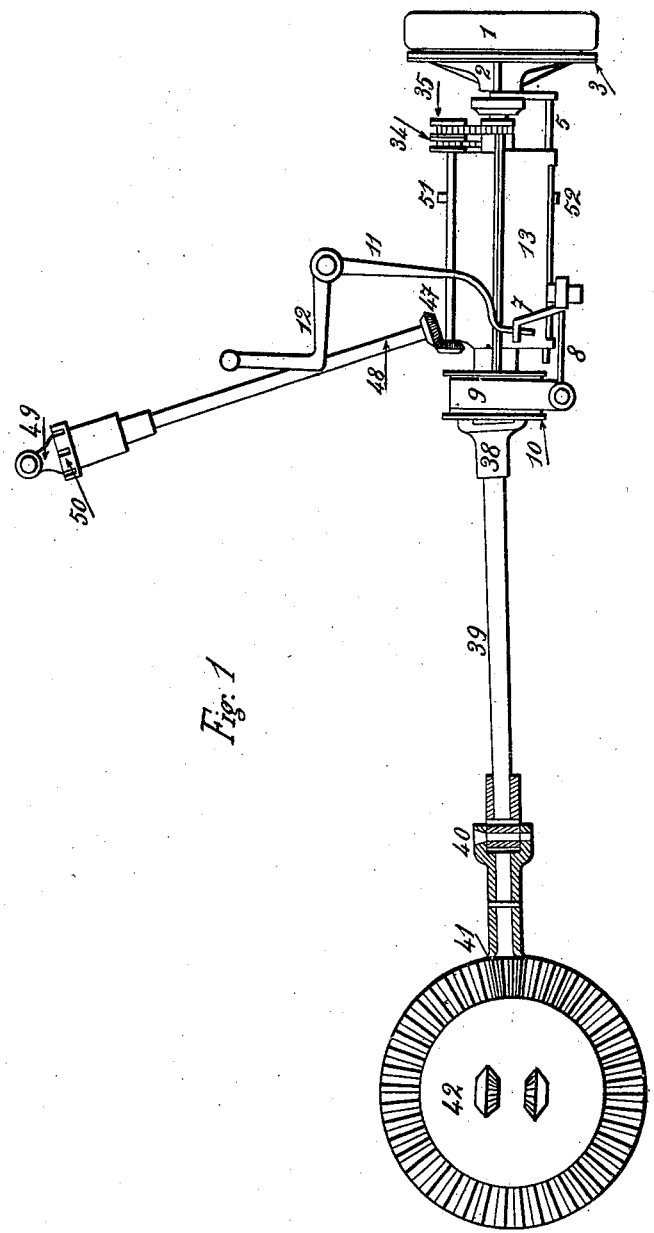

No. 660,924. Patented Oct. 30, 1900.
L. RENAULT.
DRIVING AND SPEED CHANGING MECHANISM FOR MOTOR VEHICLES.
(Application filed July 22, 1899.)
(No Model.) 9 Sheets—Sheet 1.

Witnesses:

Inventor:
Louis Renault.
By
Attorneys.

No. 660,924. Patented Oct. 30, 1900.
L. RENAULT.
DRIVING AND SPEED CHANGING MECHANISM FOR MOTOR VEHICLES.
(Application filed July 22, 1899.)
(No Model.) 9 Sheets—Sheet 2.

Witnesses:

Inventor:
Louis Renault.
By
Attorneys.

No. 660,924. Patented Oct. 30, 1900.
L. RENAULT.
DRIVING AND SPEED CHANGING MECHANISM FOR MOTOR VEHICLES.
(Application filed July 22, 1899.)
(No Model.) 9 Sheets—Sheet 3.
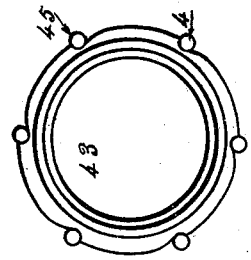
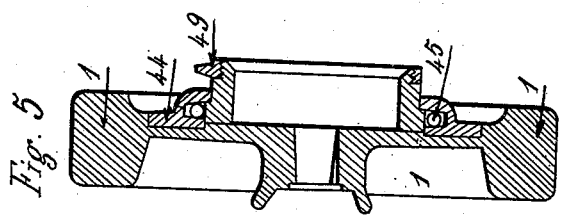
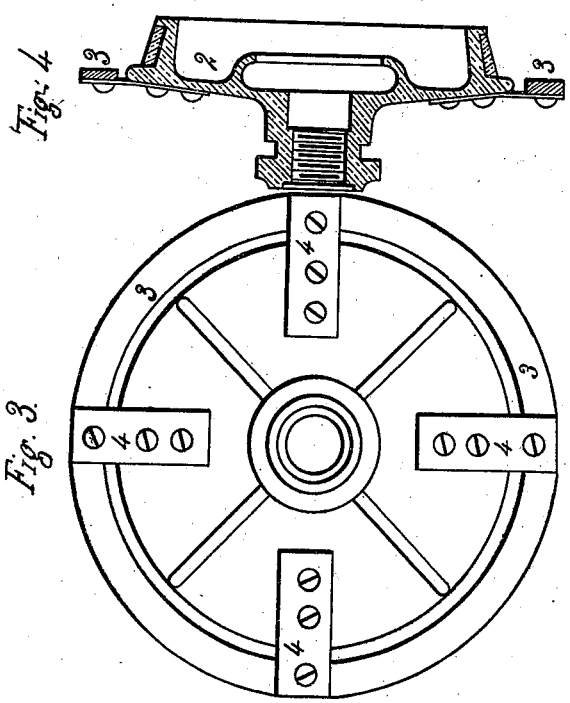
Witnesses
C. E. Holske
JB Owens
Inventor
Louis Renault.
By Munn
Attorneys No. 660,924. Patented Oct. 30, 1900.
L. RENAULT.
DRIVING AND SPEED CHANGING MECHANISM FOR MOTOR VEHICLES.
(Application filed July 22, 1899.)
(No Model.) 9 Sheets—Sheet 4.
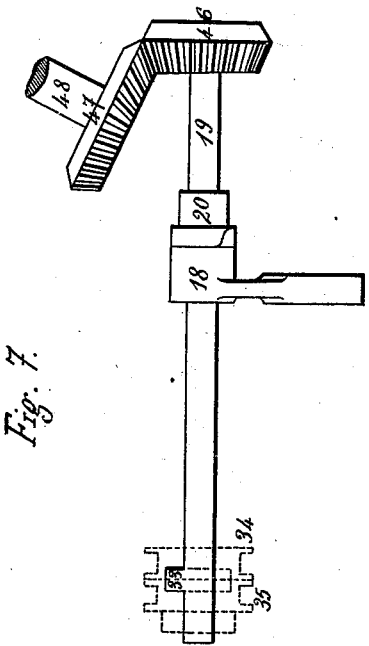
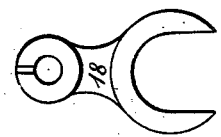
Witnesses:
C. E. Holske
J. B. Owens
Inventor
Louis Renault.
By Munn
Attorneys.

No. 660,924. Patented Oct. 30, 1900.
L. RENAULT.
DRIVING AND SPEED CHANGING MECHANISM FOR MOTOR VEHICLES.
(Application filed July 22, 1899.)
(No Model.) 9 Sheets—Sheet 5.
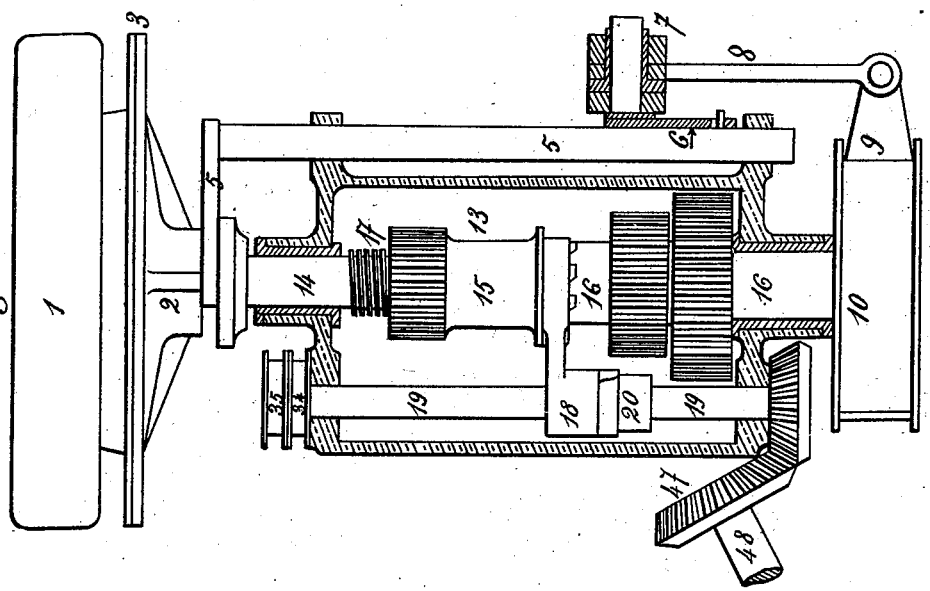
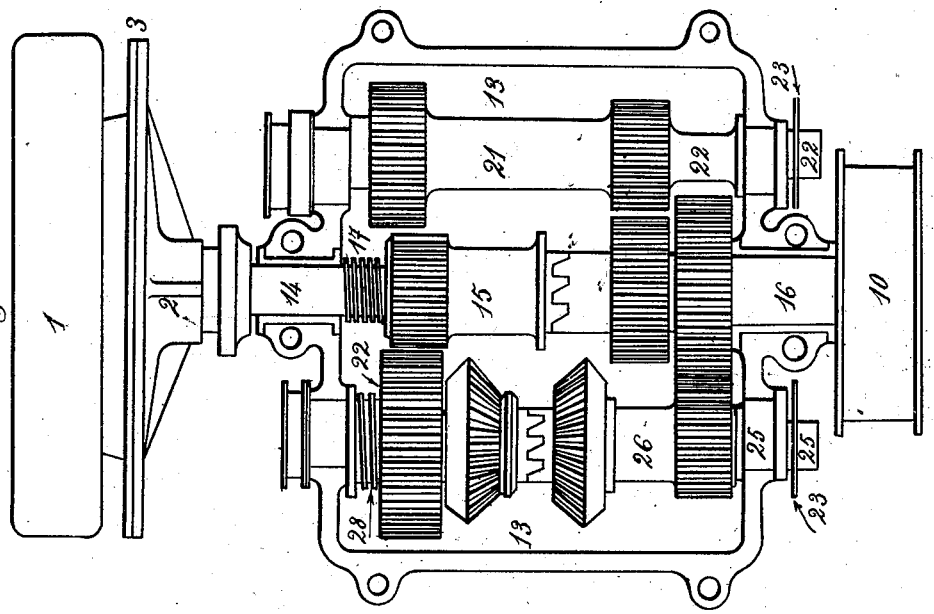
Witnesses:
Inventor:
Louis Renault.
By
Attorneys.

No. 660,924. Patented Oct. 30, 1900.
L. RENAULT.
DRIVING AND SPEED CHANGING MECHANISM FOR MOTOR VEHICLES.
(Application filed July 22, 1899.)
(No Model.) 9 Sheets—Sheet 6.
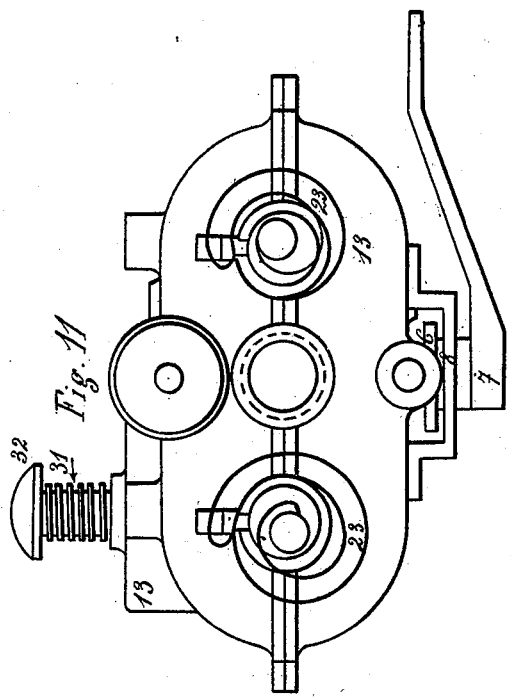
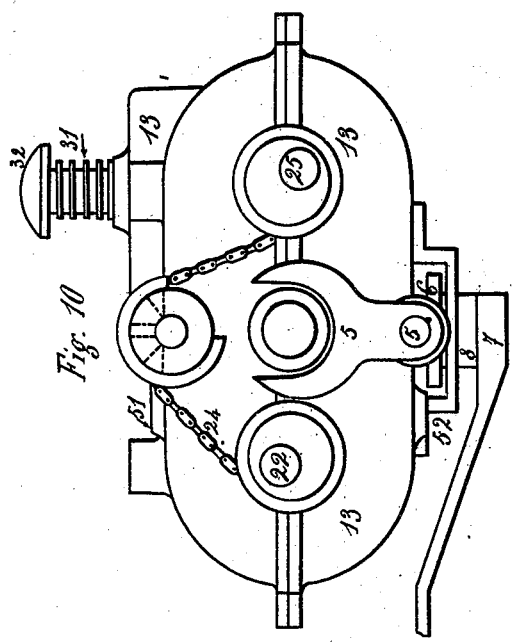
Witnesses:
Inventor
Louis Renault.
By
Attorneys.

No. 660,924. Patented Oct. 30, 1900.
L. RENAULT.
DRIVING AND SPEED CHANGING MECHANISM FOR MOTOR VEHICLES.
(Application filed July 22, 1899.)
(No Model.) 9 Sheets—Sheet 7.

Witnesses:
C. E. Holske
J. B. Owens

Inventor.
Louis Renault.
By [Attorneys]

No. 660,924. Patented Oct. 30, 1900.
L. RENAULT.
DRIVING AND SPEED CHANGING MECHANISM FOR MOTOR VEHICLES.
(Application filed July 22, 1899.)
(No Model.) 9 Sheets—Sheet 8.
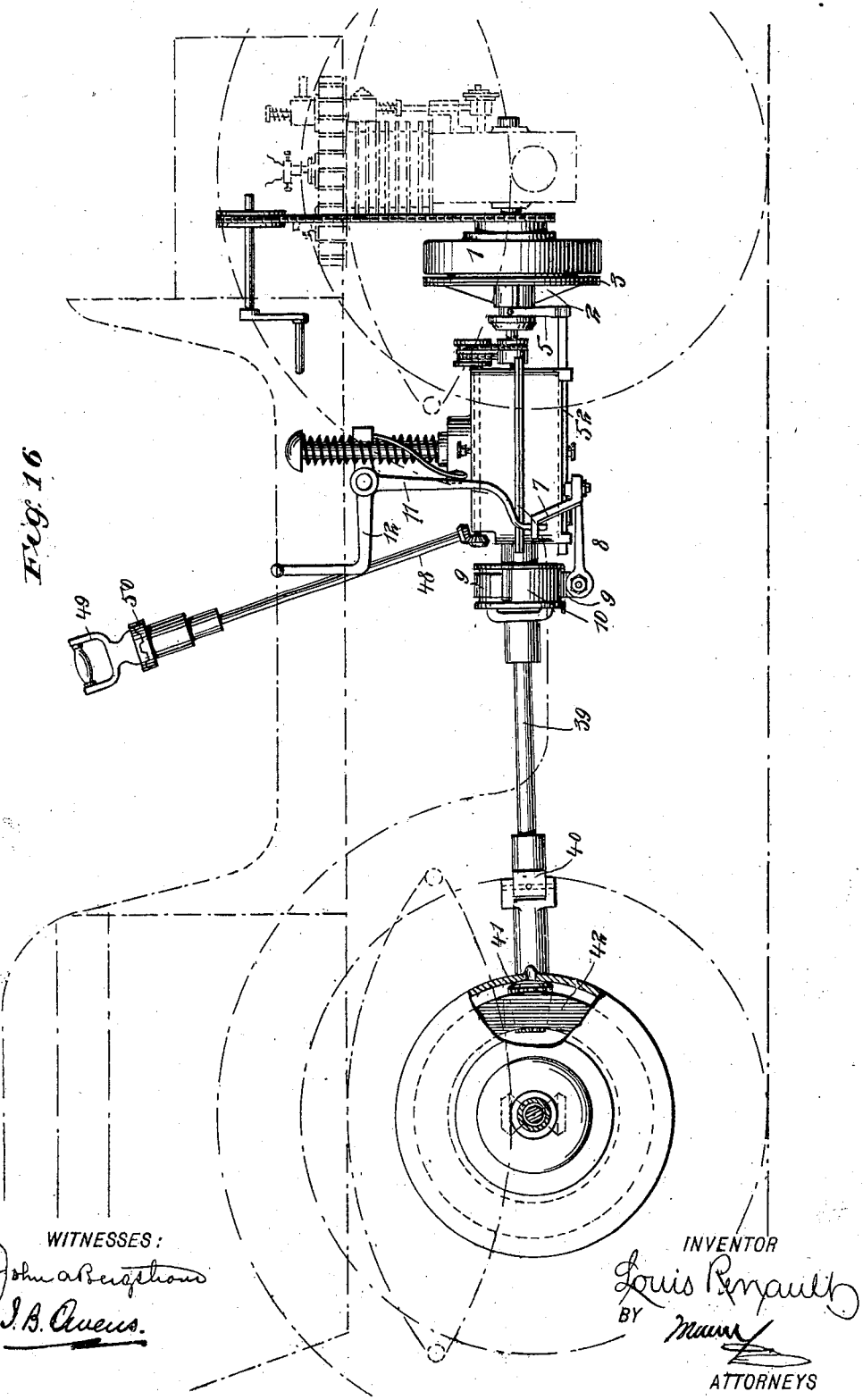
WITNESSES:
INVENTOR
Louis Renault
BY
ATTORNEYS No. 660,924. Patented Oct. 30, 1900.
L. RENAULT.
DRIVING AND SPEED CHANGING MECHANISM FOR MOTOR VEHICLES.
(Application filed July 22, 1899.)
(No Model.) 9 Sheets—Sheet 9.
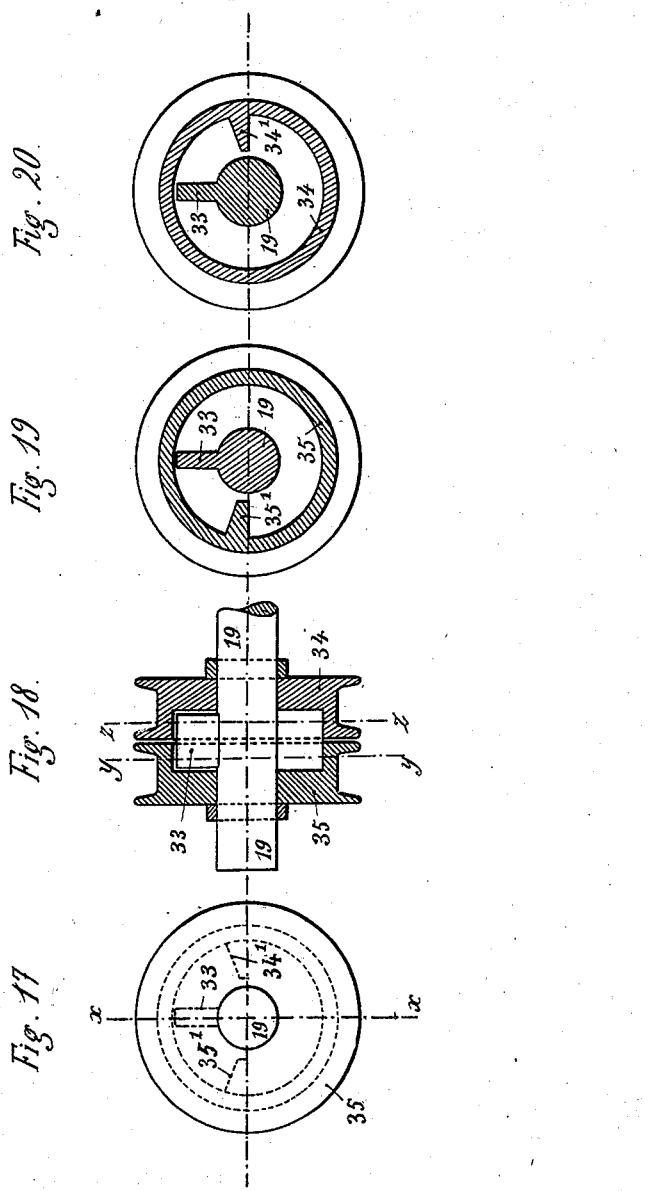

UNITED STATES PATENT OFFICE.

LOUIS RENAULT, OF PARIS, FRANCE.

DRIVING AND SPEED-CHANGING MECHANISM FOR MOTOR-VEHICLES.

SPECIFICATION forming part of Letters Patent No. 660,924, dated October 30, 1900.

Application filed July 22, 1899. Serial No. 724,842. (No model.)

*To all whom it may concern:*

Be it known that I, LOUIS RENAULT, a citizen of the French Republic, residing at Paris, France, have invented certain new and useful Improvements in Driving and Speed-Changing Mechanism for Motor-Vehicles, of which the following is a specification.

This invention relates to driving and speed-changing mechanism for motor-vehicles which is characterized by the special feature that the movement is transmitted from the motor to the wheels directly by means of gear-wheels without the intermediary of either chains or belts, although the motor and the speed-changing mechanism are suspended upon springs and are capable of displacement independently of the wheels. In addition to this the said mechanism comprises a special arrangement which enables motion to be transmitted by means of two gear-wheels only upon level ground and during the ascent of slight inclines, thereby considerably reducing friction.

For each change of speed I interpose two gear-wheels entering into engagement tangentially and not laterally, this being preferable from the point of view of the deformation of the teeth. The mechanism is designed in such a manner that in changing from one speed to another the gear-wheels of the speed previously employed are rendered inoperative and no longer rotate, thereby obviating friction. Backward travel is obtained by interposing in the mechanism corresponding to the lowest speed an intermediate bevel-pinion. The whole of the changes of speed are controlled by means of friction-gearing, which is rendered extremely progressive owing to a special arrangement. This gearing is operated by means of a pedal, which also serves to actuate a brake. Change of speed is effected by means of a single hand-lever, while backward motion is produced by means of a second pedal. Upon the fly-wheel of the friction-gearing is provided an engaging device without teeth, the driving of which is effected by wedging balls within a groove, the said engaging device being operated by means of a chain and serving to start the motor, the omission of teeth resulting in a diminution of friction and noise.

In order that my said invention may be readily understood and easily carried into effect, I will now proceed to describe the same more fully with reference to the accompanying drawings, which illustrate, by way of example, an improved driving and speed-changing mechanism with three changes of speed designed according to my invention. It will, however, be obvious from the following explanations that the number of the said changes of speed may be increased or diminished without departing from the essential principle of the invention.

Figure 2:
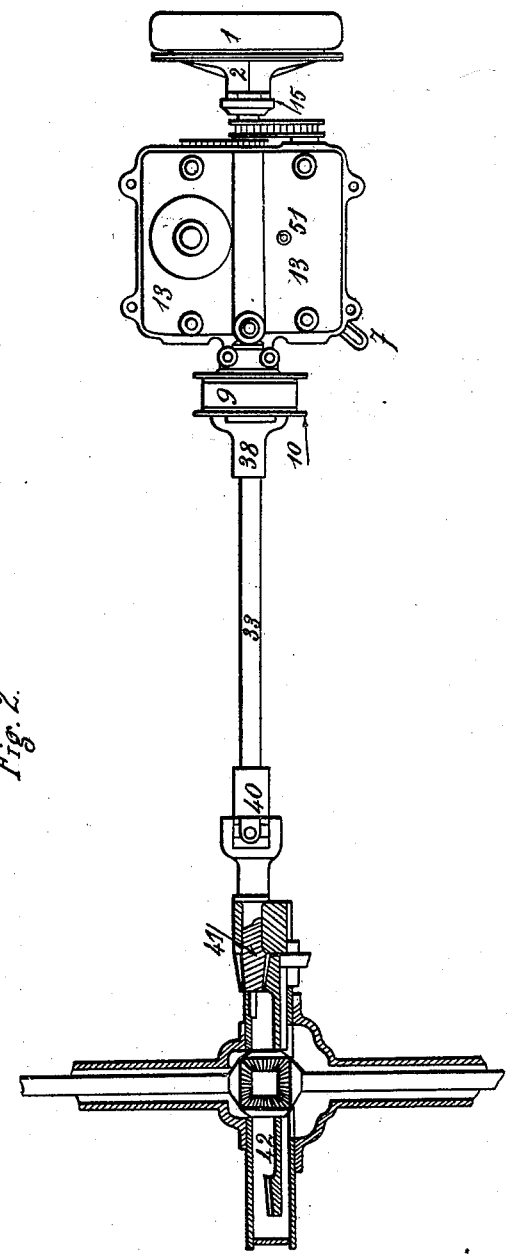
Figure 13:
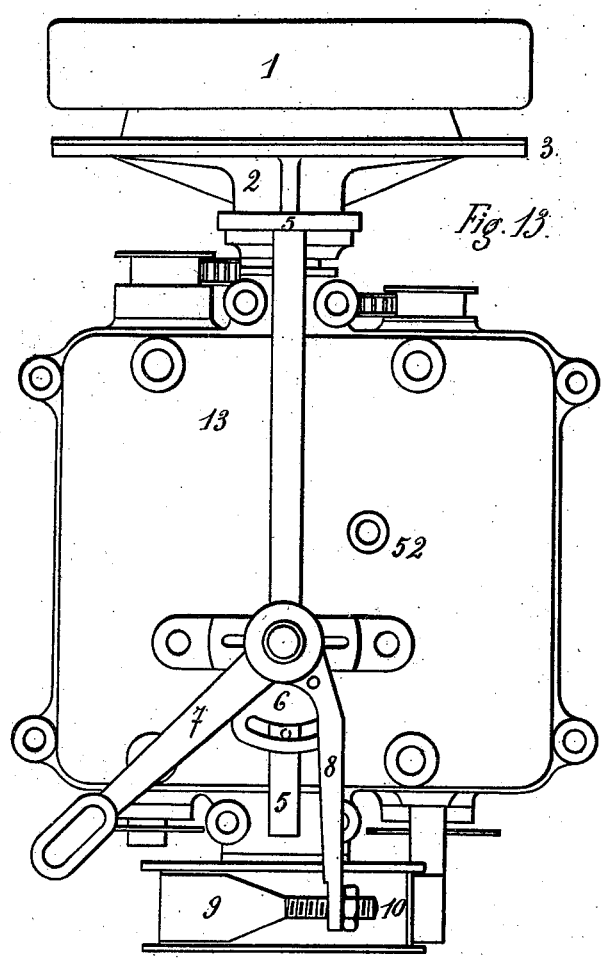
Figure 14:
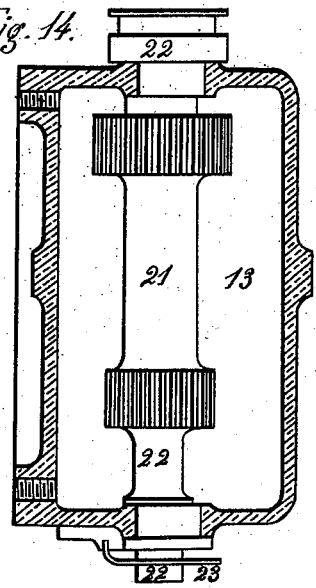
Figure 15:
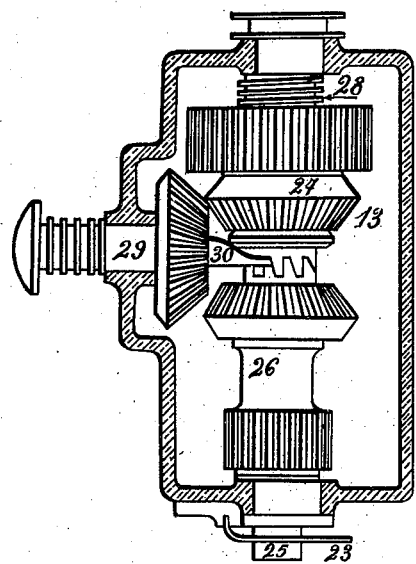

In the drawings, Figure 1 is a side elevation of the whole mechanism. Fig. 2 is a top view of the same. Fig. 3 is an elevation of the rear face of the gearing-cone. Fig. 4 is an axial transversal section of said gearing-cone. Fig. 5 is an axial transversal section of the motor fly-wheel and of the ball-clutch. Fig. 6 is a face view of the said clutch. Figs. 7 and 8 are respectively a longitudinal elevation and an end view of the device, enabling me to disengage and put out of gear the speed-changing mechanism. Fig. 9 is a top view of the casing of the speed-changing mechanism, the cover of said casing being removed in order to exhibit the internal parts. Figs. 10 and 11 are end views of the said casing, taken, respectively, from the clutch side and from the brake side. Fig. 12 is a section through the central axis of the same. Fig. 13 is a top view thereof. Fig. 14 is a section through the axis of the device controlling the intermediate speed. Fig. 15 is a section through the axis of the device controlling the lower speed. Fig. 16 is a side view of the invention, showing it applied to the vehicle. Fig. 17 is an end view of the grooved hollow chain-pulleys to be fully described hereinafter. Fig. 18 is a section on the line $x\ x$ of Fig. 17. Fig. 19 is a section on line $y\ y$ of Fig. 18, and Fig. 20 is a section on line $z\ z$ of Fig. 18.

The fly-wheel 1 of the motor is formed with a cavity, Fig. 5, having the form of a truncated cone, within which is adapted to engage a gearing-cone 2, Fig. 4, of the same form provided with a ring or annular piece 3 for progressive driving, which is attached to it by means of springs 4 4, Fig. 3. This cone is operated by means of the disengaging-fork 5, Figs. 1 and 12, actuated by a lever 7 and a cam 6. Another loose lever 8 is provided for operating the pedal-brake, the band 9 of which is wound upon a brake-drum 10, the release of the brake being effected by means of levers 11 and 12, Fig. 1.

Within the casing 13 of the mechanism is arranged a shaft 14, Figs. 9 to 12, to which is rigidly connected the engaging cone 2. A pinion 15 is keyed upon said shaft 14 to slide thereon and is provided on its hub with teeth, forming a clutch member engaging with teeth of the same form on the hub of two pinions 16, loosely mounted on the shaft 14. The pinion 15 is pressed toward the pinions 16 by a spiral spring 17. A disengaging-fork 18, Figs. 7, 8, and 12, operated by the shaft 19, carrying the cam 20, enables the two pinions to be rigidly connected one with the other at will. Two other pinions 21, permanently connected one with the other, are mounted loosely upon a shaft 22, which is supported at its extremities by eccentrics, Fig. 10, in such a manner that if this shaft is caused to rotate upon the said eccentrics by means of a chain 24, Fig. 10, a lateral displacement of the said shaft 22 is produced, which enables the said pinions 21 to be either engaged or disengaged, a spring 23 tending always to maintain them out of engagement. Another shaft 25 carries two pinions 26 and 27, provided with notches, forming an engaging device, and which, under the influence of a spring 28, tends to remain constantly in engagement. These pinions 26 and 27 as a whole have a different ratio from that of those previously described—that is to say, they produce different speeds.

The pinions which have just been referred to are rigidly connected with two bevel-pinions. At the upper portion of the casing of the mechanism is a pinion mounted upon a shaft 29, which is provided with a fork 30 and a spring 31, kept in place by a knob 32. The driver of the vehicle pressing upon this knob with his foot depresses the pinion 27, pushing before it the fork 30, the incline face of which, separating the two other pinions 26 and 27 from each other, renders them independent one of the other. The pinion mounted upon the fork-shaft 29 then gears with the two bevel-pinions 26 and 27, thereby producing a rearward motion.

Disengagement of the pinion 15 from the pinion 16 is effected by means of a fork 18 and cam 20, operated by a shaft 19, which is provided at its extremity with a spur or projection 33, arranged between two pulleys 34 and 35. Within said pulleys are two projections 34' and 35', arranged upon either side of the first-mentioned projection 33. (See Figs. 17 to 20.) These pulleys are provided externally with cheeks, upon which are fixed two chains in such a manner that the rotation of the said pulleys causes the rotation of one or other of the two shafts 21 25 by means of the said chains.

The arrangement of pinions 16, which carries the brake-drum 10, is connected by means of a Cardan joint 38 with a shaft 39, keyed loosely upon this latter, which is itself connected by means of a second Cardan joint 40 to a bevel-pinion 41, driving a gear-wheel 42, fixed upon the differential mechanism which actuates the wheels of the vehicle directly.

The motor is started by operating a ball-clutch, Figs. 5 and 6, consisting of a ring 43, within which are formed six notches, serving for the reception of the balls 45. This ring 43 is capable of rotating within a second ring 44, within which is formed a groove in which the balls 45 enter. If the ring 43 is caused to rotate in the direction of the arrow, Fig. 6, the balls remain at the bottom of the notches, and no clutching action takes place between the balls of the ring and the groove, the ring remaining fixed, although the fly-wheel is rotating. If, however, the ring 43 is caused to rotate in the reverse direction, the balls 45 follow the incline of the groove formed upon the ring 43 and become wedged within the groove, thereby causing the said ring to participate in the movement of the fly-wheel.

The shaft 19 upon which the cam is mounted is provided at its extremities with a pinion 46, which gears with another pinion 47, fixed upon a shaft 48, provided at its upper portion with a handle adapted to engage in notches 50 for the purpose of maintaining the said pinion 47 in the various positions corresponding to the different speeds.

The casing 13 of the mechanism is filled with oil in order to insure perfect lubrication, the filling and emptying of the said casing being effected by means of plugs 51 and 52.

The working of the above-described mechanism is as follows: Assuming that the motor has been started—that is to say, that the fly-wheel 1 is rotating—this starting being effected by operating, by means of a crank-handle, the ring 43 through the medium of a chain which passes around a second pinion, as soon as the motor will have attained a speed greater than that of the ball-clutch the action on the ring 43 will cease, and consequently the chain and crank-handle will no more rotate, the same working taking place as with an ordinary pawl-and-ratchet device. The fly-wheel 1 now rotating, it will be possible, as hereinabove explained, by means of the pedal 12, the levers 11 and 7, and the cam 6, to shift laterally the gearing-cone 2. In such conditions the ring or annular piece 3, placed around the latter and maintained by the very flexible springs 4, comes in contact with and bears against the fly-wheel before the gearing-cone is engaged, and, whereas the springs 4 are calculated in view of being capable to start the vehicle in motion without this engagement having taken place, a progressive driving is thus obtained. When the gearing-cone is engaged into the fly-wheel, the coupling becomes very rigid, whereby any sliding of the driving-wheels on the ground is avoided. A groove provided in the clutch 2 serves to retain the lubricating-oil, which might otherwise be projected during the running of the vehicle. If the disengaging pedal is completely depressed, the lever 7 draws, through the medium of a pin or stud, the lever 8, which actuates the brake-band passing around the drum and stretches it upon the latter. The pedal 12 thus serves as it will be readily understood, both to produce the disengagement and to put the brake into action.

The changes of speed are effected in the following manner: Assuming the cam 20 in the position shown in the drawings, the pinions 15 and 16 are invariably connected with each other, and the rotating movement is transmitted directly without the medium of any gearing from the fly-wheel 1 to the friction device 2, from the latter to the shaft 14, from said shaft to the pinion 15, from this pinion to the pinion 16, and from the latter to the intermediate shaft 39 by the Cardan joint 40 driving the pinion 41, which latter actuates the opinion 42. If the handle is rotated, it results therefrom, according to the direction of the rotation, the disengagement of the pinions 15 and 16 and the engagement either of the pinions 21 or of the pinions 26 and 27, whereby three changes of speed may be obtained. When the whole of the pinions 26 and 27 are engaged, if the pinion 29 is pushed the latter is interposed between the pinions 26 and 27 and changes the direction of the rotating movement. In this manner the friction when running at high speed is reduced to a minimum, as the movement is transmitted from the motor to the wheels through the medium of the bevel-gears 41 and 42 only, whereby the noise, like the friction, is diminished.

The engagements of the speed-changing devices are effected laterally, and owing to the transmission of the movement from the pinion 15 to the two pinions 16 or from the pinion 15 to the pinions 27 and 26 a comparatively small and light speed-changing mechanism may be constructed after this system.

Having now particularly described and ascertained the nature of my invention and in what manner the same is to be performed, I declare that what I claim is—

1. In gearing for motor-vehicles, the combination of friction-clutch mechanism forming a coupling, a brake working with one section of the coupling, means for actuating the brake and coupling in unison, and means for transmitting the movement of the coupling-section with which the brake is connected.

2. In gearing for motor-vehicles, the combination of clutch and brake mechanisms, a toothed wheel, and a shaft connecting the clutch and brake mechanisms with the toothed wheel, the connections of the shaft being such as to permit the independent play of the clutch and brake mechanisms with respect to the toothed wheel.

3. In a gearing for motor-vehicles, the combination of a primary-movement member driven from the motor, a clutch working with said member, a shaft driven by the clutch, the shaft being in two sections with a releasable connection between them, variable-speed gear for driving the sections of the shaft, and movement-transmitting devices in connection with said shaft.

4. The combination of a shaft formed in two sections, a clutch connecting the sections with each other, an eccentrically-mounted shaft, movable eccentrically toward and from the first-named shaft, gears fastened to the several shafts, and means for operating the clutch and for throwing the eccentric-shaft in unison with each other.

5. The combination with a casing, of a shaft mounted therein and formed in two sections, a clutch connecting the sections, a shaft mounted in the casing, means in connection with the shaft for throwing the clutch, a third shaft eccentrically mounted in the casing and movable toward and from the first-named shaft, gear-wheels attached to the first-named shaft and to the eccentric-shaft, and means for throwing said eccentric-shaft, such means having connection with the second-named shaft.

In witness whereof I have hereunto set my hand in presence of two witnesses.

LOUIS RENAULT.

Witnesses:
VICTOR ECCARD, Jr.,
EDWARD P. MACLEAN.